(12) United States Patent
Bahr et al.

(10) Patent No.: US 10,869,264 B2
(45) Date of Patent: Dec. 15, 2020

(54) ACCESS POINT COORDINATION

(71) Applicant: Cable Television Laboratories, Inc., Louisville, CO (US)

(72) Inventors: John C. Bahr, Superior, CO (US); Neeharika Allanki, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 23 days.

(21) Appl. No.: 15/874,383

(22) Filed: Jan. 18, 2018

(65) Prior Publication Data
US 2018/0206184 A1 Jul. 19, 2018

Related U.S. Application Data

(60) Provisional application No. 62/459,467, filed on Feb. 15, 2017, provisional application No. 62/447,563, filed on Jan. 18, 2017.

(51) Int. Cl.
*H04W 4/00* (2018.01)
*H04W 48/20* (2009.01)
*H04W 24/02* (2009.01)
*H04W 24/10* (2009.01)
*H04B 17/318* (2015.01)
*H04W 84/12* (2009.01)
*H04L 12/26* (2006.01)
*H04W 88/08* (2009.01)

(52) U.S. Cl.
CPC ........... *H04W 48/20* (2013.01); *H04W 24/02* (2013.01); *H04B 17/318* (2015.01); *H04L 43/08* (2013.01); *H04L 43/087* (2013.01); *H04L 43/0864* (2013.01); *H04L 43/0888* (2013.01); *H04W 24/10* (2013.01); *H04W 84/12* (2013.01); *H04W 88/08* (2013.01)

(58) Field of Classification Search
CPC ..... H04W 48/20; H04W 24/02; H04W 84/12; H04W 24/10; H04W 88/08; H04L 43/08; H04L 43/087; H04L 43/0888; H04L 43/0864; H04B 17/318
USPC ........................................................ 370/338
See application file for complete search history.

(56) References Cited

U.S. PATENT DOCUMENTS

| | | | |
|---|---|---|---|
| 9,179,380 B1* | 11/2015 | Sitaram ................. | H04W 36/08 |
| 2005/0059396 A1* | 3/2005 | Chuah ................... | H04W 24/02 |
| | | | 455/435.1 |
| 2008/0056177 A1* | 3/2008 | Mori ..................... | H04W 52/04 |
| | | | 370/318 |
| 2010/0085938 A1* | 4/2010 | Chen .................... | H04W 36/08 |
| | | | 370/331 |
| 2016/0353382 A1* | 12/2016 | Xue .................. | H04W 52/0251 |

* cited by examiner

*Primary Examiner* — Mang Hang Yeung
(74) *Attorney, Agent, or Firm* — Great Lakes Intellectual Property, PLLC

(57) ABSTRACT

Coordinating access points (APs) used to facilitate network access is contemplated, such as but not necessary limited to facilitating coordination among a plurality of APs in a wireless local area network of a home or other location where the plurality of APs cooperate to facilitate interfacing signaling with another network.

19 Claims, 3 Drawing Sheets

ACCESS POINT COORDINATION

CROSS-REFERENCE TO RELATED APPLICATIONS

This application claims the benefit of U.S. provisional application No. 62/447,563, filed Jan. 18, 2017, and U.S. provisional application No. 62/459,467, filed Feb. 15, 2017, the disclosures of which are hereby incorporated in their entireties by reference herein.

TECHNICAL FIELD

The present invention relates to coordinating access points (APs) used to facilitate network access, such as but not necessary limited to facilitating coordination among a plurality of APs in a wireless local area network of a home or other location where the plurality of APs cooperate to facilitate interfacing signaling with another network.

BACKGROUND

Providing subscribers with reliable Wi-Fi coverage and capacity in a medium to large sized home or other location using a single Access Point (AP) can become challenging when the associated Wi-Fi users experience dead zones having little or no connectivity, such as at fringe areas in the home located at wireless signaling range limits of the AP and/or other areas receiving intermittent or insufficient wireless signals due to shielding, interferences or other influences. One contemplated solution to this problem includes deploying multiple APs throughout the home in an arrangement designed to provide wireless coverage sufficient to eliminate dead zones and/or to otherwise assure sufficient wireless service areas throughout the home. The use of multiple APs within the home or other location can become problematic from at least a network optimization and performance standpoint due to an inability of the APs to coordinate client associations and radio resources, particularly when the wireless local area network (WLAN) is operated without assistance from or independently of a wireless local area network controller (WLC). One non-limiting aspect of the present invention contemplates ameliorating the network optimization and performance concerns by enabling coordination between APs, including but not limited to addressing network optimization and performance concerns associated with sticky clients, AP overloading, radio frequency (RF) interference, excessive AP switching ("ping-ponging"), etc.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
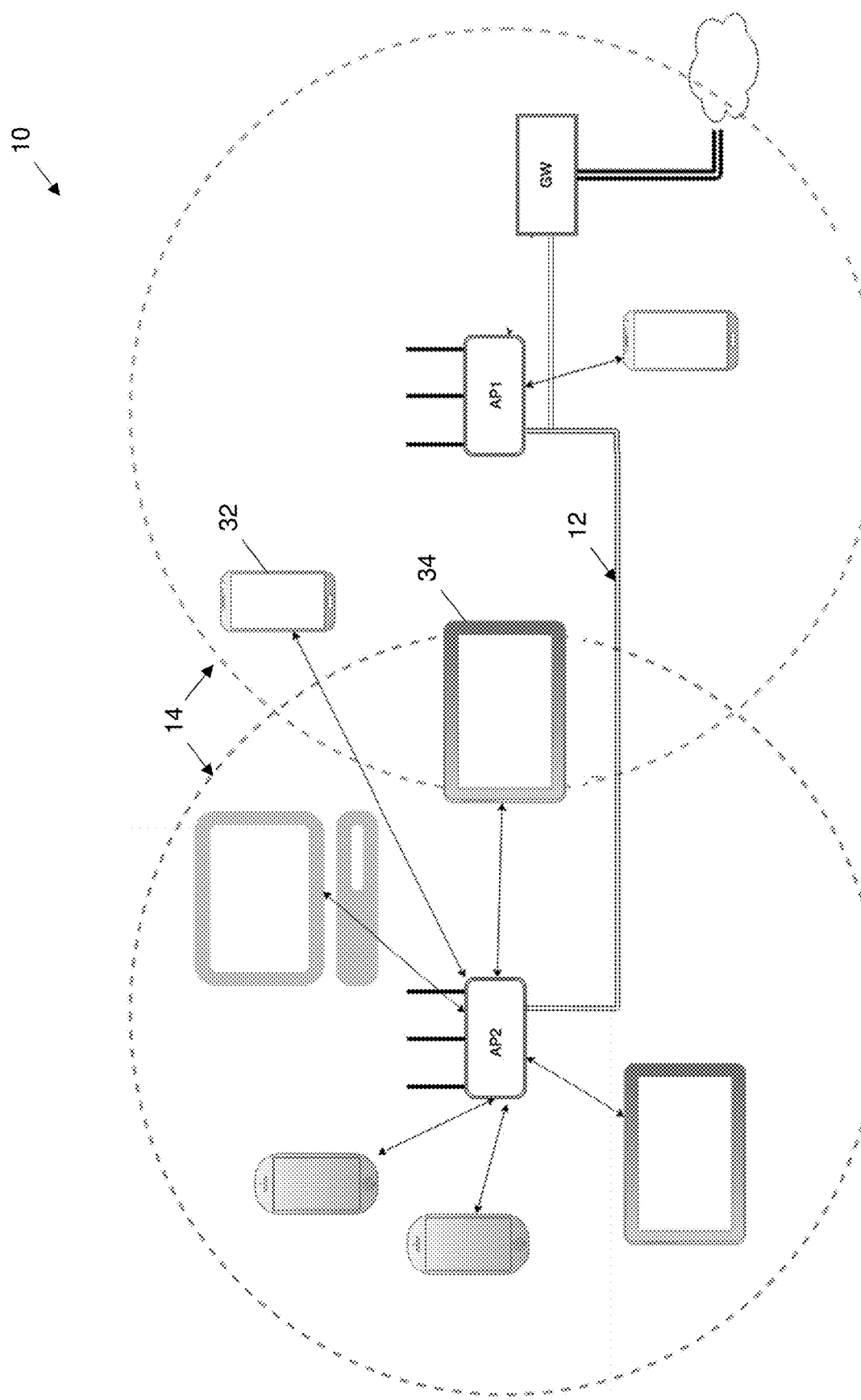
FIG. 1 illustrates a system having AP coordination in accordance with one non-limiting aspect of the present invention.

FIG. 1 illustrates a system 10 having access point (AP) coordination in accordance with one non-limiting aspect of the present invention. The system 10 may include a plurality of APs 12 having capabilities sufficient to facilitate interfacing wireless signals with a plurality of clients 14. The clients, which may optionally be referred to as stations (STAs), and the APs connected or associated therewith (solid lines) may operate according to any suitable communication protocol, and are predominately described for non-limiting purposes as providing Wi-Fi signaling in accordance with Institute of Electrical and Electronics Engineers (IEEE) 802.11: Telecommunications and information exchange between systems—Local and metropolitan area networks—Specific requirements—Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. The exemplary description of the present invention may be utilized with non-Wi-Fi environments and is predominant described with respect to Wi-Fi for non-limiting purposes in order to demonstrate the capability of the present invention to facilitate coordination within a wireless networking environment where APs or other client interfaces may lack sufficient capabilities to coordinate activities for purposes of maximizing network optimization and performance, including but not limited to maximizing network optimization and performance with respect to sticky clients, AP overloading, radio frequency (RF) interference, excessive AP switching ("ping-ponging"), etc.

The system 10 is shown to include three APs operating to facilitate interfacing the clients with an external or wide area network (WAN), such as that associated with an Internet service provider (ISP) or other multiple system operator (MSO). A first AP (AP1) and a second AP (AP2) are shown with respect to wireless service area associated therewith, and a third device is shown to be acting as a gateway (GW). The GW is shown to be a standalone item from AP1 for exemplary purposes as the functionality associated therewith may be integrated or part of AP1 and/or, the operations and capabilities of AP1 may be part of the GW. All data or other information/messaging intend to be interface with the clients, collectively referred to as client data, and intended for exchange over the WAN may be required to pass through the GW such that the GW may be considered as the last link or hop between the WAN and the plurality of APs, i.e., any data originating with the clients for transmission to the WAN and any data originating on the WAN for transmission to the clients may pass through the GW. The wireless signaling of the APs may be utilized to facilitate exchanging client data with the clients whereupon the exchanged client data may be communicated over a first local area network (LAN) 12 established between the APs, which may be referred to as a backhaul network. The wireless signaling associated with the APs (shown with dashed circles centered at AP1 and AP2) may form a second local area network 14 over which the clients communicate with APs such that the system includes two LANs 12, 14—one 14 for communication between the APs and the clients and one 12 for communication between the APs.

The second LAN 14, i.e., the network 14 for facilitating communications between the APs and the clients, may be entirely composed of wireless signaling associated with the APs. One non-limiting aspect of the present invention contemplates the system operating in a home or other location where it may be desirable to provide a singular interface for subscribers, such as to allow subscribers to easily locate their wireless network (the second LAN 14) without having to distinguish the particular AP facilitating communication with the client/device they are using. The APs may enable the singular interface concept through use of the same service set ID (SSID), i.e., each AP may broadcast identical SSIDs and facilitate wireless signaling optionally over multiple bands and/or channels. The APs may be considered to be collectively part of the same extended service set (ESS) and utilize different basic service set IDs (BSSIDs) for each basic service set (BSS), e.g., each AP in the illustrated example other than the GW, so as to enable the clients to associate with the second LAN 14 without the subscribers having to distinguish one AP from another. The first LAN 12 may be distinguished from the second LAN 14 at least in so far as the clients being unable to connect with or associate with the first LAN 12 or otherwise access signaling communicated thereover. The signaling may be carried over the first LAN 12 wirelessly and/or wiredly between the APs, e.g., part of the first LAN 12 may be wireless and another part may be wired, and/or part of the same communication medium as the second LAN 14, such as through tunneling, virtual networking, etc.

One non-limiting aspect of the present invention contemplates executing a coordination protocol amongst the APs to facilitate network optimization through steering of clients from one AP to another AP. The contemplated coordination and client steering may be executed between the APs, i.e., with APs making decisions and instructing the corresponding operations of the clients, as opposed to and optionally independently of roaming or other client-based capabilities to facilitate associating and disassociating with other APs. The AP coordination capabilities of the present invention may be considered to be distinct and separate from individual capabilities of the clients to make 802.11 roaming decisions or other decisions associated with assessing AP suitability. Such client-based capabilities may optionally be used to augment or supplement the coordination contemplated herein and/or completely or partially disabled or overridden in favor of relying upon the AP coordination to facilitate client associations and/or disassociations with the APs. The AP coordination may include the APs exchanging associated client reports (ACPs) and utilizing client information and/or other data included therein or transmitted therewith to facilitate steering operations where clients may be individually instructed by or controlled through the APs to associate and/or disassociate from particular APs for purposes of addressing network performance and optimization metrics.

Figure 2:
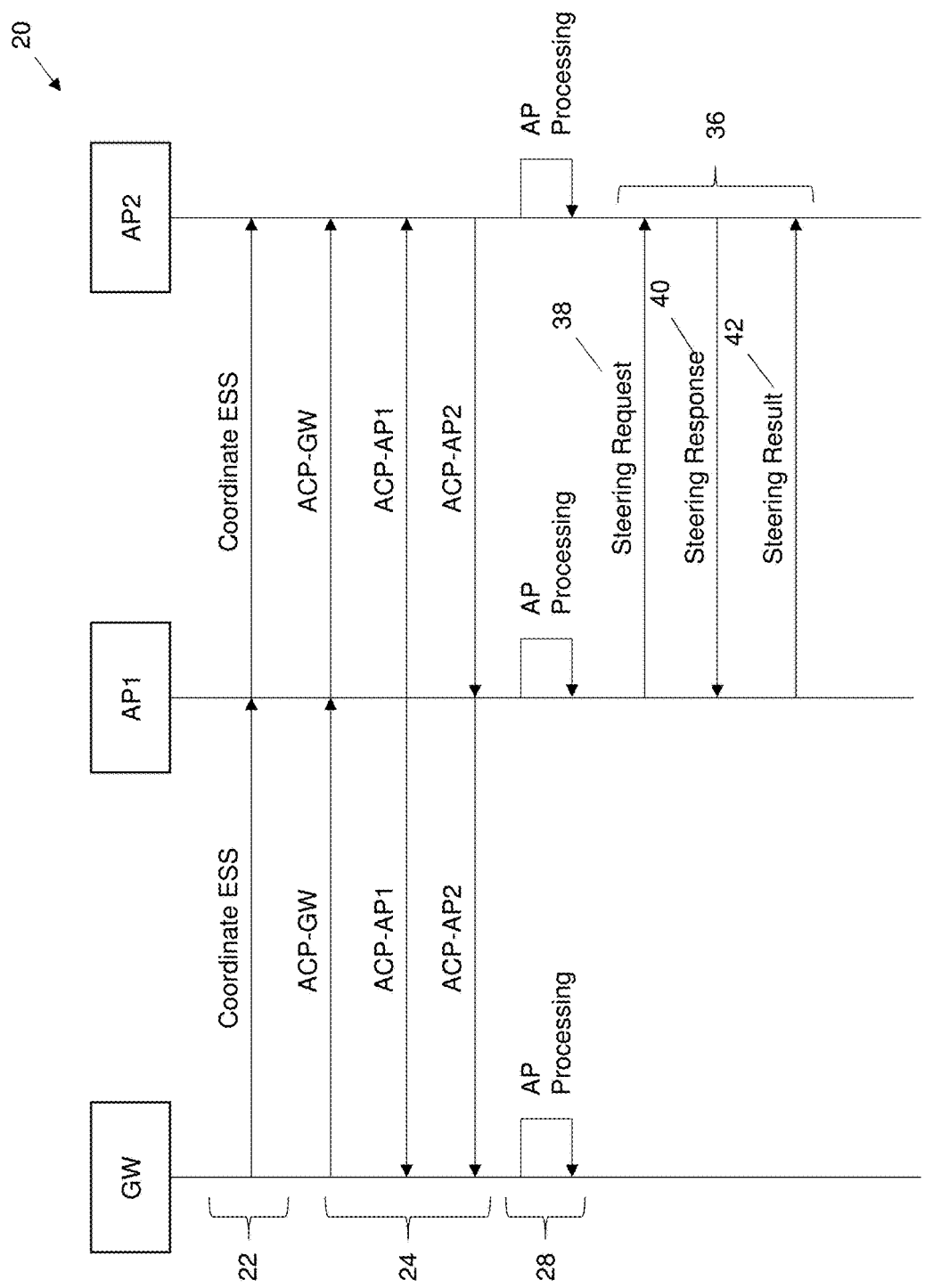
FIG. 2 illustrates a diagram of a method for AP coordination in accordance with one non-limiting aspect of the present invention.

FIG. 2 illustrates a diagram 20 of a method for AP coordination in accordance with one non-limiting aspect of the present invention. The method generally relates to the APs establishing a coordinator relationship and thereafter utilizing the coordinated relationship to facilitate steering clients from one AP to another in a manner sufficient to optimize network capabilities and performance. The AP coordination may be distributed insofar as the APs may each include capabilities sufficient to facilitate making decisions and requesting APs and/or clients to execute in response thereto. The distributed nature of the contemplated AP coordination may be beneficial in enabling a home networking environment where network performance capabilities may be optimized without having to employ a wireless local area controller (WLC), or at least a WLC within the home or as part of or downstream of the GW. Each AP may include a non-transitory computer-readable medium having a plurality of non-transitory instructions stored thereon and executable with a processor to facilitate one or more of the operations contemplated herein. The AP coordination may commence with the APs executing a coordinate ESS process 22 where the APs may discover each other, such as through a UPnP or other suitable protocol, and thereafter establishing the first LAN 12 or otherwise perform operations sufficient to facilitate exchanging configuration, programming, variables and other information contemplated herein to facilitate steering clients, e.g., the coordinate ESS process 22 may instigate as new APs are added and/or removed from the home.

One non-limiting aspect of the present invention contemplates the APs utilizing security, encryption or other mechanisms to protect communications over the first LAN 12, such as to prevent snooping by the clients and/or other devices attempting to direct or control the clients to perform a steering operation in an unauthorized manner. The security and privacy of all information exchanged between the APs may be facilitated through: identification and authentication of each AP within the ESSID (e.g., mutual authentication); setting up a secure channel between all the APs; and ensuring confidentiality and integrity of the data (specifically client information data). The APs may coordinate exchange of information about all the clients connected to the ESS to ensure that each client's privacy/confidentiality is maintained, including: assuring information about each client, i.e. its mac address, client's make and model, firmware version etc., which maybe be included in exchanged messaging, are transmitted over an encrypted or secured channel to thwart client/user tracking and open up other attacks on the client and to assure that information is exchanged over a secure channel only between authenticated AP's; maintaining the system according to an inter-AP protocol so as to thwart a rogue device within an ESS may impersonate itself as an AP for purposes of receiving information about other clients; verifying each message received by an AP for authenticity and that the secure channel associated channel not prone to a man-in-the-middle attack or DoS attacks/threats; attaches where a rogue AP or a malicious client (or a man-in-the-middle) can send malicious messages that would trigger client(s) to be steered towards itself (e.g. by falsely claiming high RSSI with a client) which can result in the client getting disconnected from its existing AP and being denied service; and spoofing attacks where rogue client within an ESS may impersonate/spoof other client(s) and result in an AP incorrectly detecting the target client's connection parameters which may result in the attack target being incorrectly steered to a sub-optimal AP.

These and other attacks on the system 10 may be addressed with various security measures, which may include: an AP authentication where each AP needs to be registered and authenticated within the ESS before starting the coordinated communications contemplated herein, which may optionally be done at the time of AP deployment within the ESS, and which may be accomplished using embedded X.509 certificates within an AP and/or shared password/PSK specifically for the AP Coordination Protocol which is configured on each AP, which may be different from the PSK configured for the SSID/ESSID); securing communications using TLS/DTLS for communication, which may include suites based on authentication mechanism and/or use of a WPA2-PSK key with PAKE to create a TLS/DTLS channel using either the shared password or certs to authenticate the PAKE; and/or message integrity/confidentiality by requiring signing of each message, if backed by X.509 certs, just a mutually authenticated TLS/DTLS channel may be sufficient. The ability of the APs to securely share configuration, programming, variables and other information associated with executing the coordinate ESS process may be beneficial in allowing the APs to establish parameters for metrics and decisions to be made based on the client information and other data included within the ACPs to be exchanged thereafter.

The coordinate ESS process 22 may include the APs communicating with each of the other APs, either directly (e.g., unicast/multicast) or through a daisy-chain or other means, so as to facilitate establishing the first LAN 12 or other suitable backhaul network therebetween in a manner that allows for information to be securely exchanged thereafter, and optionally in a manner sufficient to establish a control plane independent of the clients. The information shared between the access points as part of the coordinate ESS process 22 may include a number of configuration parameters to be utilized when the APs make during decisions and other operational executions. One non-limiting aspect of the present invention contemplates the configuration parameters including one or more of the following: an AssociatedClientReportFrequency variable indicating how often each AP sends ACPs over the first LAN; a Steering RequestResponsePeriod variable indicating how long each AP has to send a SteeringRequest after receipt of one of the ACPs and how long each AP must wait for receipt of all SteeringRequests after sending one of the ACPs; a 5GHzTo2_4 GHzPreference variable indicating a maximum amount that a signal-to-noise ratio (SNR) of a 5 GHz basic service set (BSS) can be lower than a SNR of a 2.4 GHz BSS on the same AP to steer one or more clients from the 2.4 GHz BSS to the 5 GHz BSS; an APToAPSNRSteeringThreshold variable indicating a minimum SNR difference between the SNR of one of the APs relative to another one of the APs to warrant steering one of the clients; a PingPongOccurances variable indicating a maximum number of times one or more of the clients can ping-pong back and forth between APs within PingPongTime seconds before the one or more of the clients is steered to it the AP with a higher media access control (MAC)address; a PingPongTime variable indicating a time period during which ping-pongs are counted; a PingPongHysteresis variable indicating a minimum difference that SNR must be between two APs before a client characterized as ping-pong can be steered to another AP; a ReceivedProbeStaleTimer variable indicating how long probe request information is to be retained on the APs before being discarded; and a MaximumSteeringTimeout variable indicating maximum time that the APs permit the client to associate before indicating a failure.

Figure 3:
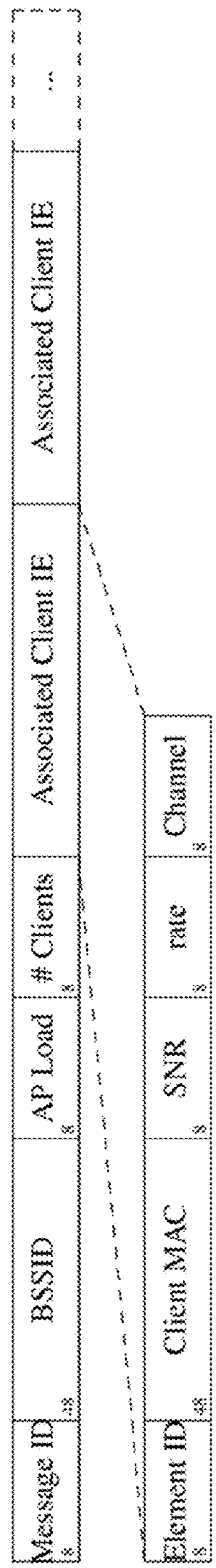
FIG. 3 illustrates an ACP message for communicating or supplementing communication of an ACP from one AP to another in accordance with one non-limiting aspect of the present invention.

An ACP exchange process 242 may commence after the APs have established the first LAN 12 and communicate the configuration parameters and other information associated with coordinating the activities necessary for supporting wireless services in the contemplated manner. The ACP exchange process 24 may include the APs each generating an ACP and then communicating that ACP to each of the other APs. The ACPs may be files, XML schema, documents or other constructs sufficient for communicating information between the APs. The individual ACPs may include client information regarding the clients associated therewith, i.e., information regarding ongoing communications with the associated clients, and/or client information non-associated clients, i.e., clients that may not be actively associated with the AP but in communication therewith or in a wireless range thereof. FIG. 3 illustrates an ACP message 26 for communicating or supplementing communication of an ACP from one AP to another in accordance with one non-limiting aspect of the present invention. The ACP message 26 may be formatted as shown to include the BSSID of the originating AP, the originating AP load/airtime utilization, the number of clients (N) in the ACP (associated with the originating AP), and N AssociatedClientIEs (identifiers of each client). The AssociateClientIE may contain the AssociatedClient Element ID (0x81) and the AP (associated) observed client information including the client MAC address, the SNR of the client, and the current PHY rate that the client is achieving and channel number of the BSS that the client is utilizing.

The ACPs, the ACP messages 26 or other client information shared as part of the ACP exchange process may optionally include: client association metrics for indicating at least one of a number of associations and a number of disassociations; current client link metrics for each associated client indicating at least one of throughput, packet error rate (PER), relative signal strength indicator (RSSI), signal-to-noise ratio (SNR) and modulation encoding scheme (MCS) index value; client capabilities for each associated client indicating at least one of supported operating channels and bands, support for 802.11k or 802.11v, Wi-Fi Alliance (WFA) Agile Multi-Band™ and Optimized Connectivity Experience (OCE)™; client channel utilization/load per basic service set (BSS); client band association history for each associated client; desired band for each associated client; and client steering history for each associated client, i.e., whether the client has been steered before. In addition to such client information, the APs may include additional information within the ACPs or otherwise exchanged as part of the ACP process 24. This additional information may include: link quality metrics for communication with the gateway that indicate at least one of throughput, jitter and latency; communication capabilities of the AP for available channels, available bands, channel width, auto channel selection, supported transmit powers and whether 802.11h is supported; current settings, the current settings for channels in-use, extension channel(s), guard Interval, transmit power, whether 802.11h is supported, and regulatory domain; observed noise floor per channel; and relative location of the AP to each of the other APs in dB if known.

The client information and that additional information noted above may be distinguished from other information made available to the AP from the client, such as through sharing of radio resource measurements (RRM) in compliance with IEEE 802.11k. The RRM or other information provided from the client may include neighbor reports for extended service set (ESS) and non-ESS neighbors, the neighbor reports including channel, QoS capable, automatic power save delivery (APSD) capable, whether part of a mobility domain, throughput capabilities and BSS Transition Management preferences; and/or traffic stream and traffic category measurement reports. One non-limiting aspect of the present invention contemplates contrasting the information collected in accordance with the described AP coordination versus the information commonly employed in IEEE 802.11 implementations as the information collected in accordance with the present invention may be independent of and different than that utilized in IEEE 802.11, particularly with respect to the information shared between APs and the decisions APs make based thereon due to the IEEE 802.11 implementations relying upon client decisions when executing roaming operations whereas the present invention relies upon AP decisions when executing steering operations, which may optionally execute in cooperation with or in addition to the client-based roaming operations.

An AP processing operation 28 may commence once the APs have received an ACP from each of the other APs and/or in response to some other triggering event, such as in response to detection of poor network performance. The ACPs may optionally be transmitted every X number of seconds from the APs such that the AP processing operation 28 occurs at a corresponding interval of X seconds offset from completion of the ACP exchange process 24. The AP processing operation 28 may include the APs each individually assessing the ACPs received from the other APs relative to their observed clients, i.e., the clients associated therewith already or otherwise available for association or within view thereof. The AP processing operation 28 may include the APs individually making decisions regarding network performance and capabilities, including those associated with steering clients, and otherwise executing operations to request other APs to act in accordance with those decisions, such as to request another AP to steer a particular client thereto and/or to request another AP accept a client therefrom. One non-limiting aspect of the present invention contemplates the AP processing operation 28 being sufficient to facilitate one or more of the AP coordination decisions noted in the table below (AP3 may correspond with the GW or an additional AP within the system):

| Network Issue | Trigger Event(s) | Information Shared between APs | AP Coordinated Decision |
|---|---|---|---|
| Sticky client on AP1 | AP1 sees client TX rate goes below some low limit AP1 notices there is a reduction in the overall network throughput due to the sticky client consuming too much airtime | Client MAC address; Each AP's observed RSSI of the client; client capabilities; client handoff/steering history; request and response to move client to AP2 (BSS Transition Management | AP1 and AP2 decide to move client to AP2 |
| Client #1 trying to join an overloaded AP1 when AP2 is also in range | Overloaded AP1 received ASSOC request from client | Client MAC address; Each APs' observed client RSSI; each AP's load (e.g., 802.11k Channel Load Report); client capabilities; client handoff/steering history; request and response to steer client to AP2 | AP1 and AP2 decide to steer client to associate to AP2 |
| AP1 is overloaded and some clients (#1 & #2) are within range of AP2 | AP1 sees that its number of associated clients is over some limit or that its channel load is over some limit | Each of AP1's client MAC address; AP2's observed client RSSI - for each client on AP1; each AP's load (e.g., 802.11k Channel Load Report); client capabilities; client handoff/steering history; request and response to move a set of clients to AP2 | AP1 and AP2 decide to move clients #1 & #2 to AP2 |
| Roaming QoS client on AP2 trying to join an overloaded AP1, AP3 has capacity and is in range | AP2 sees QoS client MCS rate going below some low limit | Client MAC address; client's QoS requirement (e.g., 802.11k Transmit Stream/Category Measurement Report or TSPEC submitted to AP1); Each AP's observed client RSSI; each AP's load (e.g., 802.1k Channel Load Report); client capabilities; client handoff/steering history; request and response to move client to AP3 | AP1, AP2 and AP3 decide QoS client should roam to AP3 instead of AP1 |
| AP3 experiencing interference on channel from neighbor AP | AP3 observed noise on current channel exceeds some limit, or a client on AP3 reports noise on channel above a certain limit | Each AP's or associated clients', observed Noise Histogram (e.g., 802.11k Noise Histogram Report) on current and other possible channels; all current ESS client channel capabilities; Neighbor report seen by each AP(e.g. 802.11k Neighbor Report); request and response to change channels | AP1 and AP3 decide to each change channels and AP2 decides to remain on the same channel |

FIG. 1 illustrates a sticky client scenario where a first client (client #1) 32 is associated with AP2 while beyond a service area of AP2 (dashed lines centered at AP2) or desired signaling range (RSSI) of AP2 and while within a service area of AP1 (dashed lines centered at AP1). Such a scenario may correspond with the AP1 determining from the shared ACPs that the client is associated with AP2 and using a very low PHY rate compared to what it is expected to achieve on AP1, which may occur when the client fails to roam on its own. The resulting AP coordination may include AP1 making a decision to execute a steering operation sufficient for directing the client to a target AP, i.e., AP1. The sticky client scenario may also be addressed using the exchanged ACPs by determining whether a transmission rate for communications between the currently connected AP2 and the client is below a threshold associated with a sticky-client characterization and making a decision to steer the client to AP1 over a third AP (GW with a collocated AP or another AP) when a relative signal strength indicator (RSSI) of AP1 is greater than a second RSSI of the third AP. The threshold utilized for determining a sticky-client characterization may be set according to one of the configuration parameters and/or as a function of network throughput, which may optionally include setting the threshold to be greater when the network throughput is greater and less when the network throughput is less. The network throughput may be used to indicate an amount of client data being exchanged between the clients and the WAN over a period of time.

An overloaded AP scenario may occur when one of AP1 and AP2 are overloaded when a client 34 is within both of their service areas. Such a scenario may correspond with AP2 (the target AP) seeing that a neighboring AP (AP1) is overloaded (based on AP loading information exchanged in the ACPs) and detecting that the client could obtain better performance on it (the target AP) than the overloaded AP. The resulting AP coordination may include AP2 making a decision to initiate a client steering request after it sees that the source AP (AP1) is overloaded compared to itself, and that some of the clients could be steered to the target AP. A similar scenario may occur with steering the client 34 from one band to another band of AP1, e.g., the target and source APs may be the same AP with a decision being made to steer a client from a 2.4 GHZ band to a 5.0 GHZ band. A dual-band, low bandwidth scenario may occur when an AP has a client connected on the 5 GHz band that is a low-bandwidth stationary client (e.g. a printer—based on the MAC OUI or based on deep packet inspection of traffic to/from the client) while the same the AP also sufficiently hears the client on 2.4 GHz. The resulting AP coordination may include the AP deciding to steer the client to its 2.4 GHz band from its 5 GHz band. A "ping-pong" scenario may occur when APs see a client change its association between them more than 4 times in 30 seconds. The resulting AP coordination may include the AP with the lower AP load deciding to steer the client to it and the other AP to not let the client move back to it until the RSSI changes significantly as specified in the configuration parameters.

The steering decisions based on the configuration parameters may include: a client being steered from 2.4 GHz to the 5 GHz band on the same AP if the 5 GHz SNR is greater than or equal to the 2.4 GHz SNR-15 dB (5GHzTo2_4 GHzPreference); a client being steered from another AP if the SNR difference is greater than or equal to 9 dB (APToAPSNRSteeringThreshold); a client being steered from the source AP if the source AP has 4 more clients (APClientLoadNumClientsDifferential) than the target AP as long as the client difference is within 12 dB (APClientLoadSNRDifferential); a client being be steered to the AP with the lowest load when seen to "ping-pong" on its own between two APs more than 4 times (PingPongOccurances) in 30 seconds (PingPongTime); keeping a client from being "ping-ponged" back and forth between two AP, in the case where the SNRs are nearly the same, a client will not be steered to another AP until the SNR changes by more than 6 dB (PingPongHysteresis). (The foregoing values are merely exemplary and believed to correspond with a best mode for managing and balancing network performance and capabilities. The values may be adjusted, increased or decreased as desire to correspondingly affect behavior of the system to match an user or MSO/ISP goals.)

The ability to share ACPs between APs and thereafter enable the APs to collectively and/or to independently assess the data included therein for purposes of assessing network performance capabilities may be particularly beneficial in the above-described manner to facilitate addressing scenarios particularly affected by client activities, i.e., whether the client is connected to certain APs and the nature of the client's connection and activities. Additional decisions to implement a steering operation may be determined for non-client based reasons or in a manner independent of client activities, such as to facilitate network maintenance, software updates or other procedures where it may be beneficial to temporarily steer clients from one AP to another in order to address operations at a source AP. One such scenario may arise when an AP or radio attempting to or otherwise desiring to implement a scanning for interference, on or off the current operating channel, may disrupt servicing of clients. The disruption may be minimized through AP coordination where a decision may be made to steer clients away to other APs, then use that source or steered-from AP or radio to do any needed scanning, whereafter the clients may be steered back. This type of AP coordination can be used to "vacate" an AP or radio by steering clients to another AP or radio (albeit, possibly lowering client performance) to free up an AP or radio to do in-depth scanning of the entire RF environment, after which the AP could signal to the other APs the exchange of the ACPs that it is again ready to handle clients.

The AP processing operation 28 may result in a decision to execute a steering operation whereupon each of the APs deciding to execute such a steering operation may commence a corresponding steering operation. While multiple APs may commence steering operations, FIG. 2 illustrates an exemplary steering operation 36 between AP1 and AP2, which may be characteristic of the operations associated with facilitating steering operations for any one of the other APs. When AP1 (target) decides that a client should be steered to it, it may send a steering request message 38 to AP2 (source) that the client is associated with. The source AP (AP2) may then respond with a steering response message 40 indicating whether or not it will steer the client to the target AP (AP1). In order to avoid an event where two target APs respond with a steering request message 38 to the source AP, the source AP may be required to wait a minimum of Y*X seconds to receive all steering request messages 38 from the time it receives the first steering request message 38. One method for steering the clients may include 802.11v BSS transition management for disassociating a client and then Blacklisting (i.e. ignoring Probe Requests/Association Requests from a client) at the source AP. Both the source and target APs may tell each other all the steering methods they support within the shared ACPs so that the source AP can look at the supported steering methods of the target AP and choose the best method supported by both of them, which may be identified in the steering request message 38.

The source AP may receive multiple steering request messages 38 from different APs and assess those requests versus the ACPs to decide which request, or even none, it wants to grant. Optionally data included as part of the ACPs or the configuration parameters may dictate automatic action on the part of the source APs, such as by granting all steering request, and/or including algorithms or other mechanisms for making decisions on whether to grant a steering request, such as by comparing target AP loading/airtime utilization and target AP viewed RSSI of client to thresholds defined relative to the source AP situation or other benchmarks. The target AP may be required to always send a steering result message 42 to the source AP, whether or not the steering is successful. If successful, the target AP may send the steering result message 42 as soon as the client associates to it with a result code indicating a success. If the client does not associate to the target AP within Z seconds, e.g., 10 seconds, of the target AP receiving the steering response message, the target AP may indicate a failure result code within the steering result message 42. The result may be used to tell the source AP if the client was successfully steered to the target AP or if the steering failed. The source AP may remove any restrictions on that client reassociating, with the exception of the case of a ping-ponging client, if successful, and if unsuccessful (failure), the source AP may allow the client to reassociate. If the client still fails to reassociate or fails to remain associated until the SNR of the drops below a threshold (e.g. −75 dBm), the client will be marked as a steering failure so that it may be treated differently in the future.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for coordinating access points (APs) within a home to provide clients wireless access to a wide area network (WAN), the method comprising:
   establishing a first local area network (LAN) between the APs, the first LAN being sufficient for the APs to communicate with each of the other APs and to exchange client data with a gateway;
   exchanging associated client reports (ACPs) over the first LAN between the APs, each ACP being generated by one of the APs to report client information for the clients associated therewith;
   making a decision to execute a steering operation as a function of the ACPs being exchanged over the first LAN, the steering operation including steering a first client of the clients associated with a first AP of the APs to become associated with a second AP of the APs;
   making the decision at the second AP independently of a client-based roaming process, the client-based roaming process being executed at the first client to assess whether to disassociate from the first AP and associate with the second AP; and
   implementing the steering operation with instructions transmitted from the second AP to the first AP, the first AP responsively steering the first client to the second AP.

2. The method of claim 1 further comprising:
   determining from the ACPs a transmission rate for communications between the first AP and the first client to be below a threshold associated with a sticky-client characterization;
   determining from the ACPs the second AP to be within range of the first client; and
   implementing the steering operation.

3. The method of claim 2 further comprising selecting the second AP for the steering operation over a third AP due to a first relative signal strength indicator (RSSI) of the second AP being greater than a second RSSI of the third AP, the first RSSI and the second RSSI being included within the exchanged ACPs to indicate relative signal strength to the first client.

4. The method of claim 2 further comprising selecting the threshold as a function of network throughput such that the threshold is greater when the network throughput is greater and less when the network throughput is less, the network throughput indicating an amount of client data being exchanged between the clients and the WAN over a period of time.

5. The method of claim 1 further comprising executing a supplemental steering operation as a function of the ACPs being exchanged over the first LAN, the supplemental steering operation occurring after the steering operation and after the first client associates with a first channel of the second AP, the supplemental steering operation including steering the first client from the first channel to a second channel of the second AP.

6. The method of claim 1 further comprising encrypting the ACPs using an encryption known to each of the APs and unknown to the clients, thereby preventing the clients from decrypting or otherwise recovering the client information from the ACPs and preventing non-trusted entities from forcing the clients to steer to another AP.

7. The method of claim 1 further comprising:
   establishing the first LAN such that the gateway is one of the APs configured to interface communications between the first LAN and the WAN and such that all client data exchanged between the clients and the WAN passes through the gateway, the client data including data originating from the WAN for transmission to one or more of the clients and data originating from one or more of the clients for transmission to the WAN; and
   establishing a second LAN between the APs and the clients, the client data being communicated over the second LAN between the APs and the clients.

8. The method claim 7 further comprising preventing the clients from connecting to or associating with the first LAN.

9. The method of claim 1 further comprising the APs exchanging the ACPs every X seconds, X being a numerical value.

10. The method claim 9 further comprising the steering operation including:
    the first AP transmitting a steering request to the second AP; and
    the second AP transmitting a steering response to the first AP in reply to the steering request after determining no additional steering request being received within Y*X seconds of receiving the steering request, Y being a numerical value.

11. The method of claim 1 further comprising instructing the first client to disable the client-based roaming process prior to the second AP making the decision.

12. A method for coordinating access points (APs) within a home to provide clients wireless access to a wide area network (WAN), the method comprising:
    establishing a first local area network (LAN) between the APs, the first LAN being sufficient for the APs to communicate with each of the other APs and to exchange client data with a gateway;
    exchanging associated client reports (ACPs) over the first LAN between the APs, each ACP being generated by one of the APs to report client information for the clients associated therewith;
    making a decision to execute a steering operation as a function of the ACPs being exchanged over the first LAN, the steering operation including steering a first client of the clients associated with a first AP of the APs to become associated with a second AP of the APs; and
    each AP including the following as at least part of the client information:
    i) client association metrics for each associated client, the client association metrics indicating at least one of a number of associations and a number of disassociations;
    ii) current client link metrics for each associated client, the current client link metrics indicating at least one of throughput, packet error rate (PER), relative signal strength indicator (RSSI), signal-to-noise ratio (SNR) and modulation encoding scheme (MCS) index value;
    iii) client capabilities for each associated client, the client capabilities indicating at least one of supported operating channels and bands, support for 802.11k or 802.11v;
    iv) client channel utilization/load per basic service set (BSS);
    v) client band association history for each associated client;
    vi) desired band for each associated client; and
    vii) client steering history for each associated client.

13. The method of claim 12 further comprising the APs each individual including the following within the ACPs generated thereat:
    link quality metrics for communication with the gateway, the link quality metrics including at least one of throughput, jitter and latency;
    communication capabilities, the communication capabilities including at least one of available channels, available bands, channel width, auto channel selection, supported transmit powers and whether 802.11h is supported;
    current settings, the current settings including at least one of channels in-use, extension channel(s), guard Interval, transmit power, whether 802.11h is supported, and regulatory domain;
    observed noise floor per channel; and
    relative location to each of the other APs if known, the relative location being a distance expressed in dB.

14. The method of claim 12 further comprising the APs including radio resource measurements (RRM) received from associated clients within the ACPs.

15. The method of claim 14 further comprising the clients generating the RRM in compliance with Institute of Electrical and Electronics Engineers (IEEE) standard 802.11k.

16. The method of claim 15 further comprising the clients generating the RRM to include:
    neighbor reports for extended service set (ESS) and non-ESS neighbors, the neighbor reports including channel, QoS capable, automatic power save delivery (APSD) capable, whether part of a mobility domain, throughput capabilities and BSS Transition Management preferences; and
    traffic stream and traffic category measurement reports.

17. The method of claim 12 further comprising exchanging configuration parameters with the APs over the first LAN, the configuration parameters including a plurality of variables to be used when subsequently making the steering decision.

18. The method of claim 17 further comprising the configuration parameters including:
    an AssociatedClientReportFrequency variable indicating how often each AP sends ACPs over the first LAN;
    a SteeringRequestResponsePeriod variable indicating how long each AP has to send a SteeringRequest after receipt of one of the ACPs and how long each AP must wait for receipt of all SteeringRequests after sending one of the ACPs;
    a 5GHzTo2_4GHzPreference variable indicating a maximum amount that a signal-to-noise ratio (SNR) of a 5 GHz basic service set (BSS) can be lower than a SNR of a 2.4 GHz BSS on the same AP to steer one or more clients from the 2.4 GHz BSS to the 5 GHz BSS;
    an APToAPSNRSteeringThreshold variable indicating a minimum SNR difference between the SNR of one of the APs relative to another one of the APs to warrant steering one of the clients;
    a PingPongOccurances variable indicating a maximum number of times one or more of the clients can ping-pong back and forth between APs within PingPongTime seconds before the one or more of the clients is steered to it the AP with a higher media access control (MAC)address;
    a PingPongTime variable indicating a time period during which ping-pongs are counted;
    a PingPongHysteresis variable indicating a minimum difference that SNR must be between two APs before a client characterized as ping-pong can be steered to another AP;
    a ReceivedProbeStaleTimer variable indicating how long probe request information is to be retained on the APs before being discarded; and
    a MaximumSteeringTimeout variable indicating maximum time that the APs permit the client to associate before indicating a failure.

19. A method for coordinating multiple access points (APs) to provide multiple clients wireless services, the method comprising:
    exchanging associated client reports (ACPs) over a first local area network (LAN) between the APs to report information for clients observed with each AP;
    making a decision at a second AP of the APs independently of a client-based roaming process to execute a steering operation based on the information included within the ACPs;
    steering based on the information included within the ACPs a first client of the clients associated with a first AP of the APs to become associated with the second AP of the APs;
    steering based on the information included within the ACPs a second client of the clients associated with a first radio of the first AP to become associated with a second radio of the first AP, the first radio operating within a first frequency band and the second radio operating within a second frequency band, the first frequency band being outside of the second frequency band steering the first client independently of the client-based roaming process, the client-based roaming process being executed at the first client to assess whether to disassociate from the first AP and associate with the second AP; and steering the first client with instructions transmitted from the second AP to the first AP, the first AP responsively steering the first client to the second AP.

* * * * *